United States Patent
Bajpay et al.

(10) Patent No.: US 8,254,260 B1
(45) Date of Patent: Aug. 28, 2012

(54) METHOD AND APPARATUS FOR MANAGING PACKET CONGESTION

(75) Inventors: Paritosh Bajpay, Edison, NJ (US); Chuan-Chuen Chang, Holmdel, NJ (US); Monowar Hossain, Middletown, NJ (US); Mark Hunt, Plano, TX (US); Thiru Ilango, Holmdel, NJ (US); Michael R. Lambert, Springtown, TX (US); David H. Lu, Morganville, NJ (US); Chen-Yui Yang, Marlboro, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 287 days.

(21) Appl. No.: 11/763,950

(22) Filed: Jun. 15, 2007

(51) Int. Cl.
*H04L 12/24* (2006.01)

(52) U.S. Cl. .......................... 370/237; 370/235

(58) Field of Classification Search .................. 370/229, 370/237, 235, 216, 236, 241, 254, 252
See application file for complete search history.

(56) References Cited

U.S. PATENT DOCUMENTS

| | | | | |
|---|---|---|---|---|
| 5,781,532 A * | 7/1998 | Watt | | 370/236 |
| 5,805,577 A | 9/1998 | Jain et al. | | |
| 6,810,016 B1 * | 10/2004 | Sun et al. | | 370/241 |
| 6,813,242 B1 * | 11/2004 | Haskin et al. | | 370/229 |
| 7,457,233 B1 * | 11/2008 | Gan et al. | | 370/216 |
| 2002/0027885 A1 * | 3/2002 | Ben-Ami | | 370/254 |
| 2006/0018266 A1 * | 1/2006 | Seo | | 370/252 |
| 2006/0092850 A1 | 5/2006 | Neihardt et al. | | |
| 2006/0126509 A1 * | 6/2006 | Abi-Nassif et al. | | 370/235 |
| 2007/0030808 A1 * | 2/2007 | Croak et al. | | 370/237 |
| 2008/0247314 A1 * | 10/2008 | Kim et al. | | 370/235 |
| 2010/0265826 A1 * | 10/2010 | Khasnabish et al. | | 370/237 |

* cited by examiner

*Primary Examiner* — Andrew Lai
*Assistant Examiner* — Syed M Bokhari

(57) ABSTRACT

A method and apparatus for addressing a congestion condition in a communication network are disclosed. For example, the method receives an alert for at least one of: a trunk or a Permanent Virtual Circuit (PVC), where the trunk or the PVC is associated with a route. The method determines whether the alert is associated with a congestion condition by determining whether a trunk utilization has exceeded a first predetermined threshold for the trunk or for the at least one trunk supporting the PVC. The method then rebuilds the route if the first predetermined threshold is exceeded for the trunk or for the at least one trunk supporting said PVC.

16 Claims, 6 Drawing Sheets

METHOD AND APPARATUS FOR MANAGING PACKET CONGESTION

The present invention relates generally to communication networks and, more particularly, to a method and apparatus for providing detection and prevention of packet congestion on networks such as the packet networks, e.g., Internet Protocol (IP) networks, Asynchronous Transfer Mode (ATM) networks, Frame Relay (FR) networks, etc.

BACKGROUND OF THE INVENTION

An enterprise customer may build a Virtual Private Network (VPN) by connecting multiple sites or users over a network operated by a telephony or network service provider. For example, the enterprise customer's devices such as Customer Edge Routers (CERs) may be connected to the network service provider's Layer 2 network through a Provider Edge Router (PER). The Layer 2 network can be an Asynchronous Transfer Mode (ATM) network and/or a Frame Relay (FR) network. The voice and data packets from the customer premise may traverse the Layer 2 network prior to reaching an IP network. For example, a virtual connection such as a Permanent Virtual Circuit (PVC) may be established for the customer through a Layer 2 network, e.g., an ATM network. However, the network may have to re-route a virtual connection due to network events such as failures, maintenance activities, etc. Due to infrastructure build-out and cost limitations, the re-routes may result in less than optimal routing. The customer traffic may experience increased latency, packet loss, trunk over utilization, etc.

SUMMARY OF THE INVENTION

In one embodiment, the present invention discloses a method and apparatus for addressing a congestion condition in a communication network. For example, the method receives an alert for at least one of: a trunk or a Permanent Virtual Circuit (PVC), where the trunk or the PVC is associated with a route. The method determines whether the alert is associated with a congestion condition by determining whether a trunk utilization has exceeded a first predetermined threshold for the trunk or for the at least one trunk supporting the PVC. The method then rebuilds the route if the first predetermined threshold is exceeded for the trunk or for the at least one trunk supporting said PVC.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing detection and prevention of packet congestion. Although the present invention is discussed below in the context of ATM/FR and IP networks, the present invention is not so limited. Namely, the present invention can be applied for other networks, e.g., cellular networks and the like.

Figure 1:
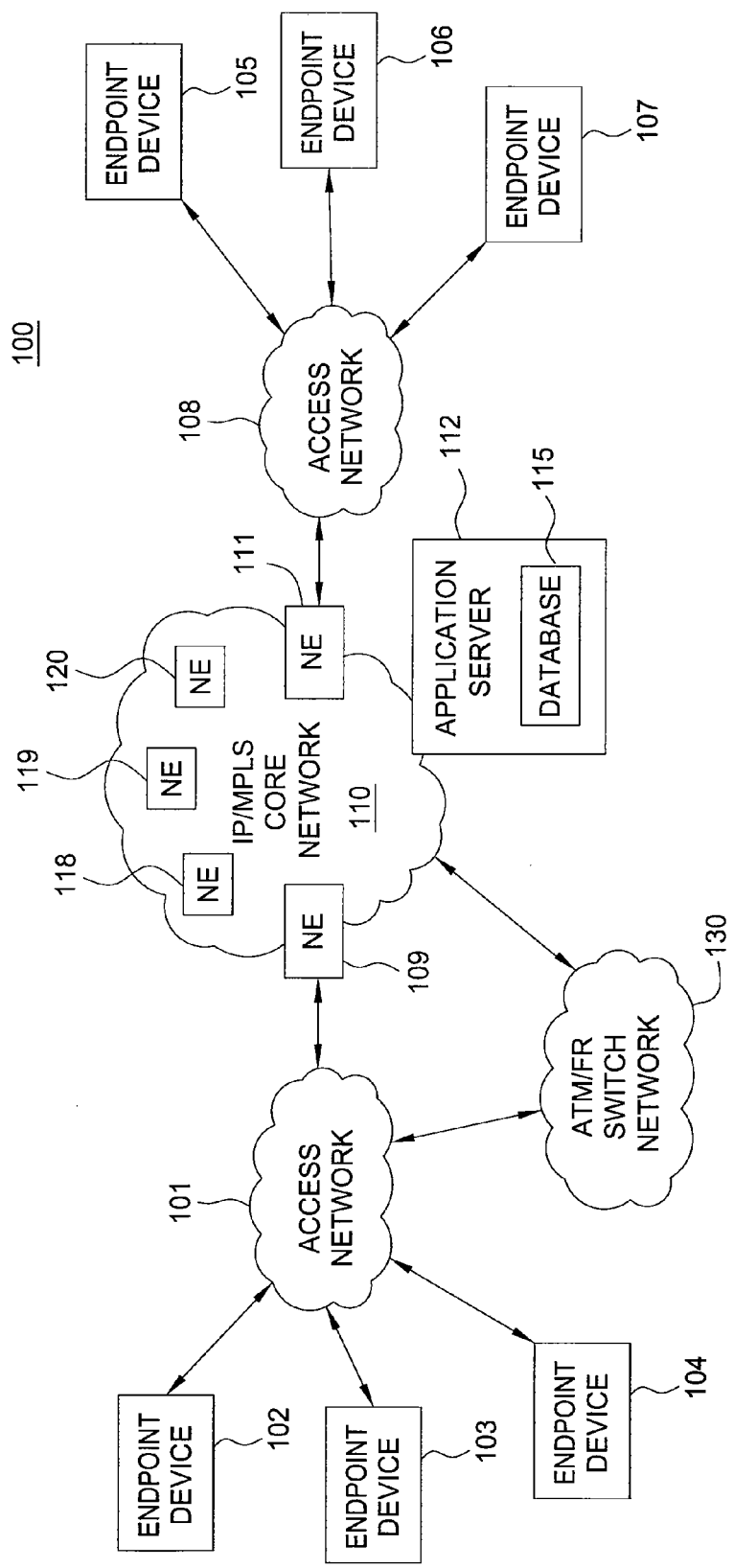
FIG. 1 illustrates an exemplary network related to the present invention.

FIG. 1 is a block diagram depicting an exemplary packet network 100 related to the current invention. Exemplary packet networks include Internet Protocol (IP) networks, Asynchronous Transfer Mode (ATM) networks, Frame-Relay networks, and the like. An IP network is broadly defined as a network that uses Internet Protocol such as IPv4 or IPv6 to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers (e.g., broadly as a border element) for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection is through the ATM/FR network 130, the packets from customer endpoint devices 102-104 (traveling towards the IP/MPLS core network 110) traverse the access network 101 and the ATM/FR switch network 130 and reach the border element 109.

The ATM/FR network 130 may contain Layer 2 switches functioning as Provider Edge Routers (PERs) and/or Provider Routers (PRs). The PERs may also contain an additional Route Processing Module (RPM) that converts Layer 2 frames to Layer 3 Internet Protocol (IP) frames. An RPM enables the transfer of packets from a Layer 2 Permanent Virtual Connection (PVC) circuit to an IP network which is connectionless.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The IP/MPLS core network 110 may also comprise an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and five network elements are depicted in FIG. 1, the communication system 100 may be expanded by including additional endpoint devices, access networks, border elements, etc. without altering the present invention.

The above IP network is described to provide an illustrative environment in which packets for voice and data services are transmitted on networks. An enterprise customer may build a Virtual Private Network (VPN) by connecting multiple sites or users over a network operated by a telephony or network service provider. The enterprise customer's devices such as Customer Edge Routers (CERs) may be connected to the network service provider's Layer 2 network through a Provider Edge Router (PER). The Layer 2 network can be an Asynchronous Transfer Mode (ATM) network and/or a Frame Relay (FR) network. The voice and data packets from the customer premise may traverse the Layer 2 network from the PER towards the IP network. For example, a virtual connection such as a Permanent Virtual Circuit (PVC) may be established for the customer through a Layer 2 network, e.g., an ATM network, from the switch/router functioning as the PER to the switch connected to the IP network. However, the network may have to re-route a virtual connection due to network events such as failures, maintenance activities, etc.

For example, if a fiber cut occurs between two switches used to build the PVC, then the connection may have to be rerouted away from the fiber cut. Due to infrastructure build-out and cost limitations, the re-routes may result in less than optimal routing. For example, the primary route might be the only direct connection between the two switches. In that case, any rerouting involves increasing the number of switches/nodes. This may also be referred to as "increasing the number of hops" between the PER and the switch attached to the IP network. In turn, the customer traffic may experience increased latency, packet loss, trunk over utilization (excessive trunk utilization), etc. For example, if the original topology provides two routes between the PER and the switch connected to the IP network and traffic is normally divided evenly between the two routes, then the reroute may result in doubling of the traffic on one route when a failure occurs on the other route. The trunks may then be over utilized, and a network alarm may be received for an excessive trunk utilization, congestion, packet loss, increased delay, etc.

Figure 2:
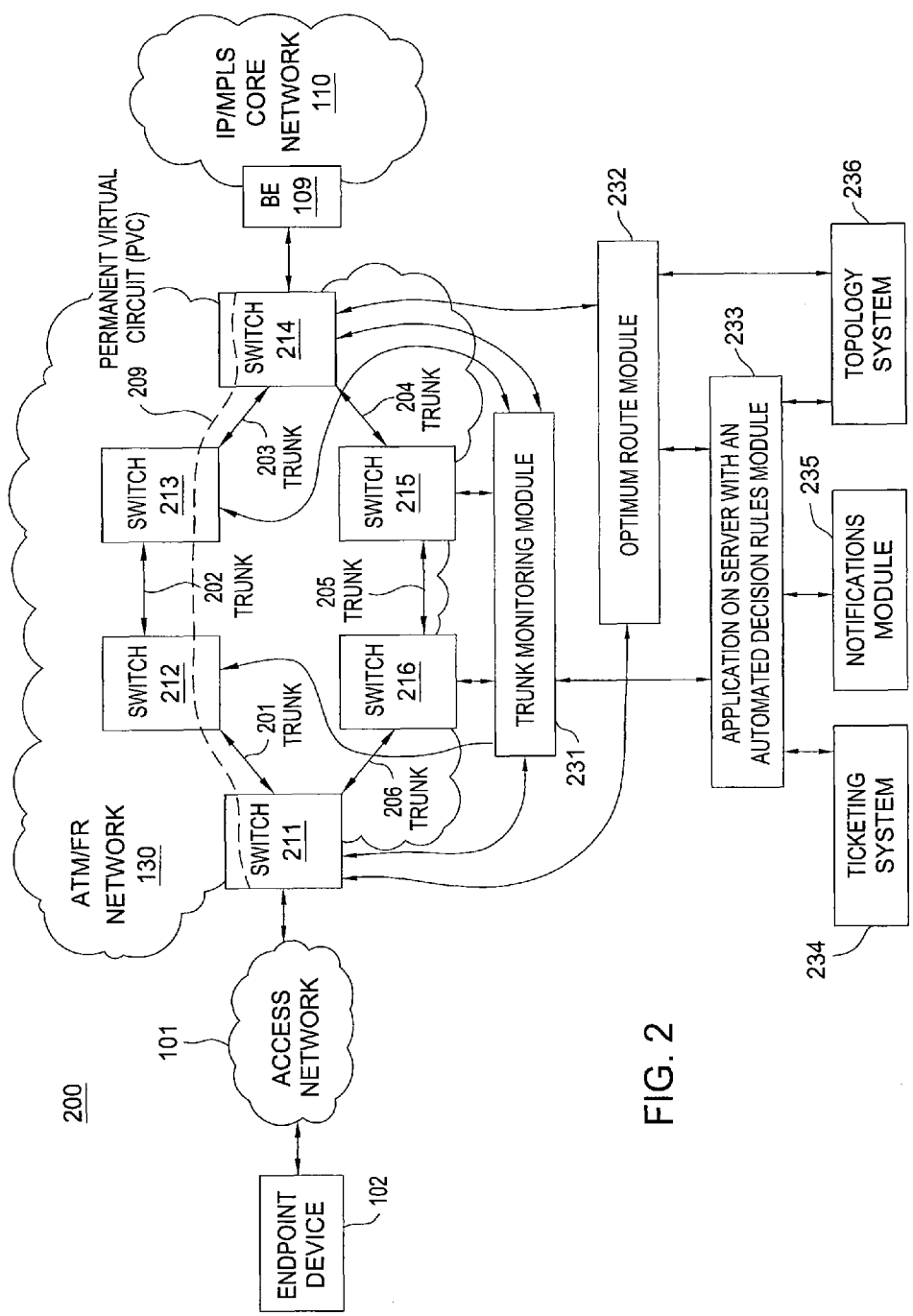
FIG. 2 illustrates an exemplary network for providing detection and prevention of packet congestion.

In one embodiment, the current invention provides a method for detection and prevention of packet congestion. FIG. 2 illustrates an exemplary network 200 in accordance with one embodiment of the current invention for detection and prevention of packet congestion. For example, a customer may use the endpoint device 102 to obtain a service from an IP/MPLS core network 110. Traffic between the endpoint device 102 and the IP/MPLS core network 110 may traverse the access network 101 and the ATM/FR network 130. The endpoint device 102 is connected to an ATM/FR switch 211 located in the ATM/FR network 130 through the access network 101. The ATM/FR network 130 may contain a plurality of ATM/FR switches 211-216. The ATM/FR switch 211 is functioning as a PER for the ATM/FR network 130 for packets originated by customer endpoint device 102. Trunk 201 connects ATM/FR switches 211 and 212. Trunk 202 connects ATM/FR switches 212 and 213. Trunk 203 connects ATM/FR switches 213 and 214. Trunk 204 connects ATM/FR switches 214 and 215. Trunk 205 connects ATM/FR switches 215 and 216. Trunk 206 connects ATM/FR switches 211 and 216. The ATM/FR switch 214 is connected to the IP/MPLS core network 110 through a border element 109. An illustrative Permanent Virtual Circuit 209 is established/built connecting ATM/FR switches 211 and 214 over trunks 201, 202 and 203 for providing a service to the customer endpoint device 102. In turn, traffic from customer endpoint device 102 directed towards IP/MPLS core network 110, traverses the ATM/FR network 130 using the permanent virtual circuit 207.

In one embodiment, a trunk monitoring module 231 is connected to switches 211-216. The trunk monitoring module 231 is tasked with monitoring the status of the trunks and PVCs. For example, when the trunk monitoring module 231 receives an alert or a ticket, it notifies the application server 233. In turn, using the received notification(s), the service provider may implement a method for providing detection and prevention of packet congestion in the application server 233 as further disclosed below.

In one embodiment, application server 233 may contain an automated decision rules module for detecting and preventing packet congestion. Application server 233 is connected to an optimum route module 232. Application server 233 may utilize the optimum route module 232 to rebuild routes. For example, the optimum route module 232 is capable of obtaining topology information relating to the network and various network elements, e.g., switches, to provide one or more recommended routes between two points, e.g., between two switches. The optimum route module 232 may have access to routing information such as various weights that are to be applied to various trunks, switches, and so on. As such, FIG. 2 illustrates that the ATM/FR switches 211 and 214 are connected to the optimum route module 232 to support routing and rerouting.

In one embodiment, the application server 233 (the server with the automated decisions rule module) is also connected to a ticketing system 234, a notifications module 235 and a network topology system 236. For example, the service provider may store the network topology including an association of PVCs, trunks, ports and switches (nodes) in the network topology system 236. For example, PVC 207 may be associated with various ports on switches 211-214. The ticketing system 234 is for generating a ticket, if necessary, and the notifications module 235 is for generating one or more notifications, e.g., a notification to an enterprise customer as to the detection of a congestion affecting the customer's service and its possible solution(s).

In one embodiment, upon receiving a notification from the trunk monitoring module 231, the application server 233 may create a ticket (if one is not already created) and invokes the current method for detecting and preventing packet congestion. For example, the application server 233 analyzes (e.g., performing a correlation) the alarms/alerts and/or tickets to identify a trunk trouble type. If a trunk failure alarm or a packet loss alarm is received, then the method performs an ATM/FR diagnosis. In one embodiment, an ATM/FR diagnosis may include monitoring and checking ATM ports, ATM channels, facility alarms/events, performing tests for PVCs, and so on. If the ATM/FR diagnosis identifies a network problem, then the method notifies the appropriate work center that handles the pertinent ATM/FR network troubles. Otherwise, the method proceeds to determine whether or not an excessive trunk delay may be the root cause for causing the congestion.

For example, if there is no trunk failure or packet loss due to an underlying network failure, the method then determines whether or not a route has exceeded a pre-determined number of switches/nodes. For example, a reroute function may have been performed that resulted in a route traversing an excessive number of switches. In other words, an excessive trunk delay may occur due to rerouting. If an excessive trunk delay is detected (or a specific alert is received from another platform or a network element that is tasked with detecting packet congestion), then the method determines whether or not trunk utilization has exceeded the provisioned capacity. For example, an enterprise customer may have experienced an increase in business and may not have updated its network capacity, e.g., the enterprise customer may not have subscribed for a service having a sufficient amount of throughput.

In one embodiment, the current method is able to determine the presence of excessive trunk utilization by utilizing information pertaining to provisioned capacity. For example, the present method may compare committed information rates (CIRs) for various customers with the actual observed traffic volume on the affected trunk(s).

Figure 4:
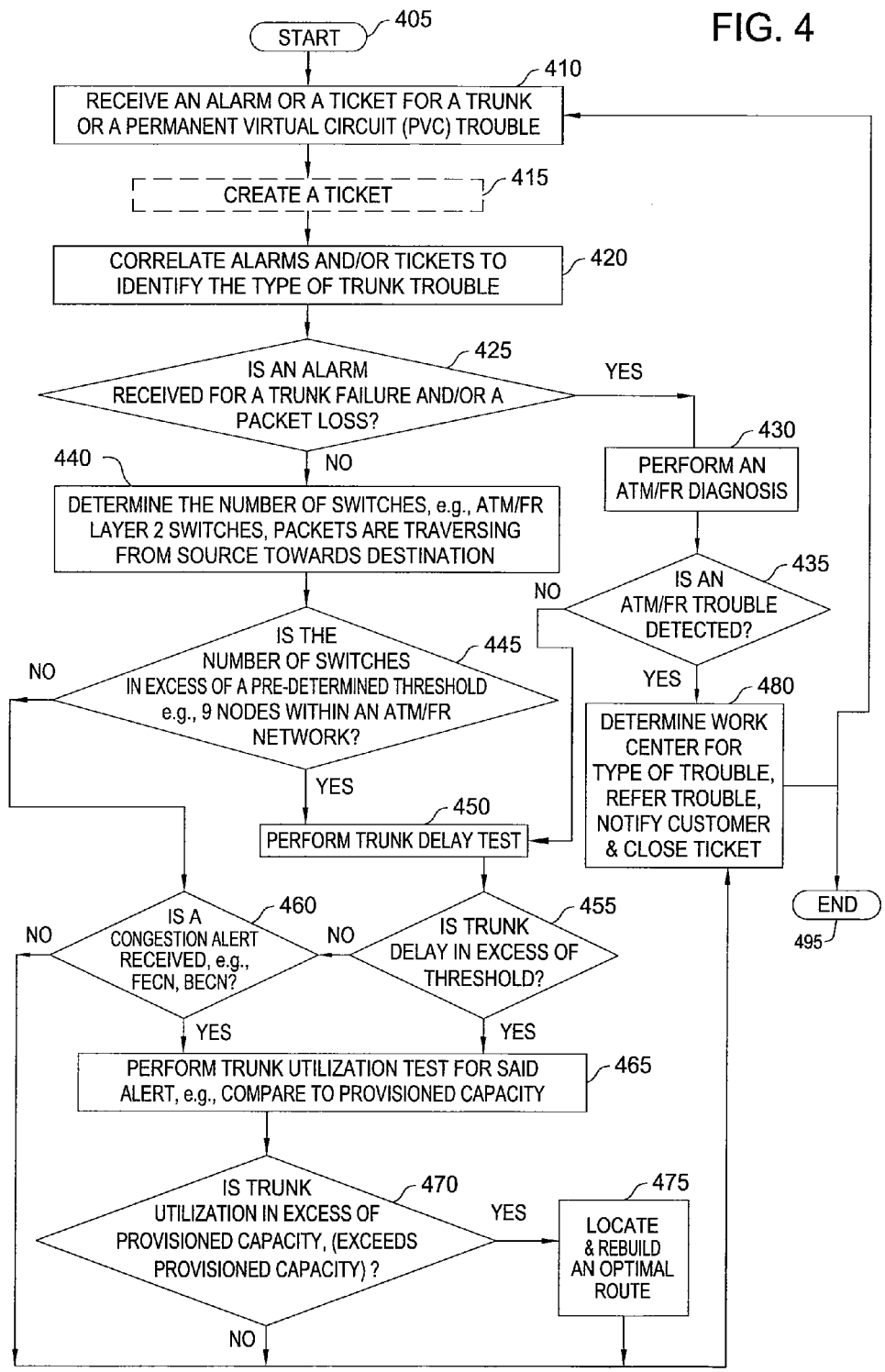
FIG. 4 illustrates a flowchart of a method for providing detection and prevention of packet congestion.

FIG. 4 illustrates a flowchart of a method 400 for providing detection and prevention of packet congestion. For example, the service provider may implement the current method for detection and prevention of congestion in an application server, with an automated decision rules module, e.g., by setting various thresholds. For example, the number of switches a packet is allowed to traverse in a Layer 2 network, a trunk delay measurement, or a trunk utilization measurement may all have predefined threshold settings. For example, a route for a packet may be considered excessive if it involves 9 switches or nodes. A trunk delay may be considered excessive if it exceeds 80 ms. A trunk utilization may be considered excessive if it exceeds 90%, and so on. Method 400 starts in step 405 and proceeds to step 410.

In step 410, method 400 receives an alarm or a ticket (broadly defined as an alert) indicating that there is a potential problem associated with a trunk or a PVC. For example, a customer may interact with a ticketing system and reports that a PVC is degraded or down. In another example, the trunk monitoring module 231 may receive an alert from a switch indicating a problem with a particular trunk, and forwards the alert to the application server 233 being used for providing detection and prevention of congestion. It should be noted that the received alert may potentially indicate that a congestion condition may affect a route that traverses over the reported trunk or a route that is traversed by said PVC.

In step 415, method 400 may optionally create a ticket, if a ticket is needed. For the example above, the application server may create a ticket for the trouble received from a switch through the trunk monitoring module 231. The method then proceeds to step 420.

In step 420, method 400 may correlate the alarm and/or ticket to identify the type of trunk trouble. For example, a ticket may have been created by a customer for a particular PVC, and the method may correlate the ticket with one or more previously reported alarms that are associated with a particular trunk failure or an event of packet loss that would affect the particular PVC reported by the customer.

In step 425, method 400 determines whether or not an alarm is received for a trunk failure and/or a packet loss. If a trunk failure alarm or a packet loss alarm is received, then the method proceeds to step 430 to perform an ATM/FR network diagnosis. Namely, since a trunk failure alarm or a packet loss alarm has been received, there is a possibility that the congestion is the result of an underlying network problem, e.g., a physical failure of a link and so on. It should be noted that the present invention is not limited to any particular method of performing ATM/FR network diagnosis. If a trunk failure alarm or a packet loss alarm is not received, then the method proceeds to step 440.

In step 430, method 400 performs an ATM/FR diagnosis. For example, the method determines if a trouble may have been caused by a failure in a Layer 1 network, access network, etc. The method then proceeds to step 435.

In step 435, method 400 determines whether or not an ATM/FR trouble is detected. If an ATM/FR trouble is detected, then the method proceeds to step 480 to refer the trouble to a work center that handles ATM/FR troubles. Otherwise, the method proceeds to step 450 to perform a trunk delay test.

In step 440, method 400 determines the number of switches that packets on the reported PVC are traversing from source towards their destination. For example, packets may traverse through an ATM/FR layer 2 network over "x" number of switches.

In step 445, method 400 determines whether or not the number of switches a packet is traversing, e.g., through an ATM/FR network, is in excess of a pre-determined threshold. For the example above, the method determines whether or not "x" is greater than nine. If the number of switches is in excess of the threshold, the method proceeds to step 450. Otherwise, the method proceeds to step 460.

In step 450, method 400 performs trunk delay tests. For example, the method may send packets to measure round trip delay through one or more trunks as discussed below. In one example, the method may use "ping" signals to various switches to determine trunk delays. The method then proceeds to step 455.

In step 455, method 400 determines whether or not the measured trunk delay is in excess of a predetermined threshold. For the example above, the method determines whether or not the trunk delay is greater than 80 ms. If the trunk delay is in excess of the predetermined threshold, then the method proceeds to step 465 to perform a trunk utilization test. Otherwise, the method proceeds to step 460.

In step 460, method 400 determines whether or not a congestion alert is received. Namely, additional alerts can be received that may potentially indicate or substantiate a congestion condition. For example, the switches/routers may contain real time counters for tracking discarded packets, thereby allowing the switches/routers to provide congestion notifications. In one example, the congestion alerts may be Backward Explicit Congestion Notifications (BECNs) and/or Forward Explicit Congestion Notifications (FECNs). Thus, it is contemplated that a congestion condition can be explicitly made know to the application server 233 by a network element. If one or more congestion alerts are received, then the method proceeds to step 465. Otherwise, the method proceeds to step 480 to notify an appropriate work center of a trouble.

In step 465, method 400 performs a trunk utilization test for the reported alert. For example, one or more trunks supporting the reported PVC are measured to determine the actual usage of the trunks by the customer. Namely, the measured utilization rate may be in excess of a Committed Information Rate (CIR) for the customer. The method then proceeds to step 470.

In step 470, method 400 determines whether or not the trunk utilization is in excess of the provisioned capacity, CIR. If the trunk utilization is in excess of the provisioned capacity, then the method proceeds to step 475. Otherwise, the method proceeds to step 480 to notify an appropriate work center of a trouble.

In step 475, method 400 locates and rebuilds an optimal route for the traffic. For example, if a PVC is traversing a long route, it may be rerouted using other switches (and/or trunks) on a shorter route. It should be noted that although rebuilding the route may involve providing a completely different route, that is not always the case. For example, in one embodiment, additional resources can be given or allocated to the network elements and/or trunks supporting the customer's PVC. For example, a second customer's PVC can be rerouted to another route, thereby freeing up capacity for the first customer's PVC. The method then proceeds to step 480.

In step 480, method 400 determines the work center for a particular type of trouble, refers the trouble accordingly, notifies the affected customer(s) and closes ticket. In one embodiment, if the congestion detected by the method 400 has been resolved by rebuilding a route for the customer's PVC, then the present method may notify the affected customer that a congestion has been detected and resolved automatically by the service provider. In doing so, the service provider may notify the customer that the congestion was the result of the customer exceeding the provisioned capacity, CIR. The service provider can then invite the customer to upgrade its current service to address the under-provisioned capacity problem. This approach allows a customer to be immediately notified of its additional needs to address the detected congestion condition, thereby increasing customer satisfaction and to provide the service provider with new opportunities to provide additional services (e.g., a service upgrade) to existing customers who are outpacing their current subscribed services. The method then returns to step 410 to continue receiving additional alerts or ends in step 490.

As discussed above, a trunk utilization test can be performed where a customer's actual usage for each trunk can be measured and tracked over time. However, this approach can be computationally expensive in certain applications, e.g., where the trunk is utilized by a large number of different customers, where large number of packets must be analyzed and categorized.

In one embodiment, the current invention may determine excessive trunk utilization very quickly by performing a trunk utilization test on two types of traffic via the trunk monitoring module 231. For example, the types of traffic are selected such that, one type of traffic is likely to be impacted by excessive trunk utilization while the other type of traffic is not likely to be impacted by excessive trunk utilization. For example, the method may measure roundtrip trunk delays as described below for Constant Bit Rate (CBR) traffic and Variable Bit Rate (VBR) traffic. VBR traffic is likely to be impacted by excessive trunk utilization, and the impact may be observed as an increase in trunk delay and/or loss. In contrast, CBR traffic (assuming it is not bursty) is not impacted by excessive trunk utilization. Furthermore, if there is an underlying network problem, e.g., a fiber cut has occurred and trunks have been rerouted, then both CBR traffic and VBR traffic will be impacted and the trunk delay and/or loss measurements may increase equally for both.

Figure 3:
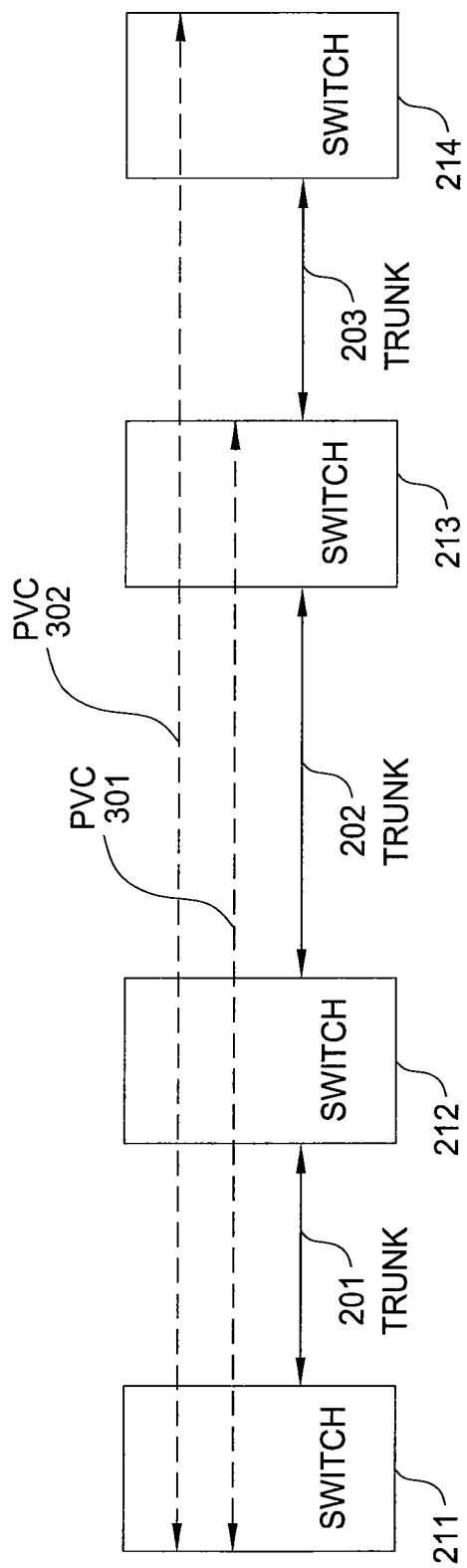
FIG. 3 illustrated an illustrative connectivity for trunk delay measurement.

In one embodiment, the current method measures roundtrip trunk delay by first setting up two predefined (e.g., preferred) Permanent Virtual Circuits (PVCs) over a shared predefined path with one PVC being one trunk longer than the other PVC. FIG. 3 illustrated an illustrative connectivity for trunk delay measurement. For example, trunk 201 connects switches 211 and 212. Trunk 202 connects switches 212 and 213. Trunk 203 connects switches 213 and 214. A PVC 301 is established/built connecting switches 211 and 213 over trunks 201 and 202. A PVC 302 is established/built connecting switches 211 and 214 over trunks 201, 202 and 203. Test traffic is then injected in both PVCs 301 and 302 and the roundtrip time is measured. Since the PVCs share trunks 201 and 202, the roundtrip delay for trunk 203 may be derived by subtracting the roundtrip time of PVC 301 (the shorter PVC) from the roundtrip time of PVC 302 (the longer PVC). Similarly, the roundtrip delay for trunk 202 may be measured by setting up one PVC over trunks 201 and 202, and a second PVC over trunk 201 alone. Note that the roundtrip delays are measured for two types of traffic, namely CBR traffic and VBR traffic.

In one embodiment, the service provider may build different pairs of PVCs for the two types of traffic. In another embodiment, the service provider injects different types of traffic on the same pairs of PVC at different times and measures trunk delay for each type of traffic. In one embodiment, the service provider performs the trunk delay measurements in a predetermined interval, e.g., every 15 minutes, 30 minutes, etc., to detect increases in trunk utilization. The trunk monitoring module 231 may then measure trunk delays for CBR traffic and VBR traffic, and determines whether or not an observed trunk delay is due to excessive trunk utilization. Broadly, the trunk monitoring module 231 may determine whether an excessive trunk utilization condition exists in a trunk.

In one embodiment, the service provider is able to associate a particular trunk delay with an estimated level of trunk utilization. This association can be constructed by sending a certain amount of traffic onto each trunk and then measuring the trunk delay. This approach can be repeated by incrementally increasing the amount of traffic placed onto the trunk until the capacity of the trunk is completely used, thereby providing an association between trunk delay with an estimated level of trunk utilization. This process can be repeated for each type of traffic as well, e.g., CBR traffic and VBR traffic and the like. It should be noted that association between trunk delay with an estimated level of trunk utilization may be different for different types of traffic.

When an excessive trunk utilization is detected, the trunk monitoring module 231 may create an alert/alarm and forwards it to the application server 233 with automated decision rules for handling congestion situations. For example, the application server may then use the trunk utilization information to reroute traffic as needed for a particular PVC.

Figure 5:
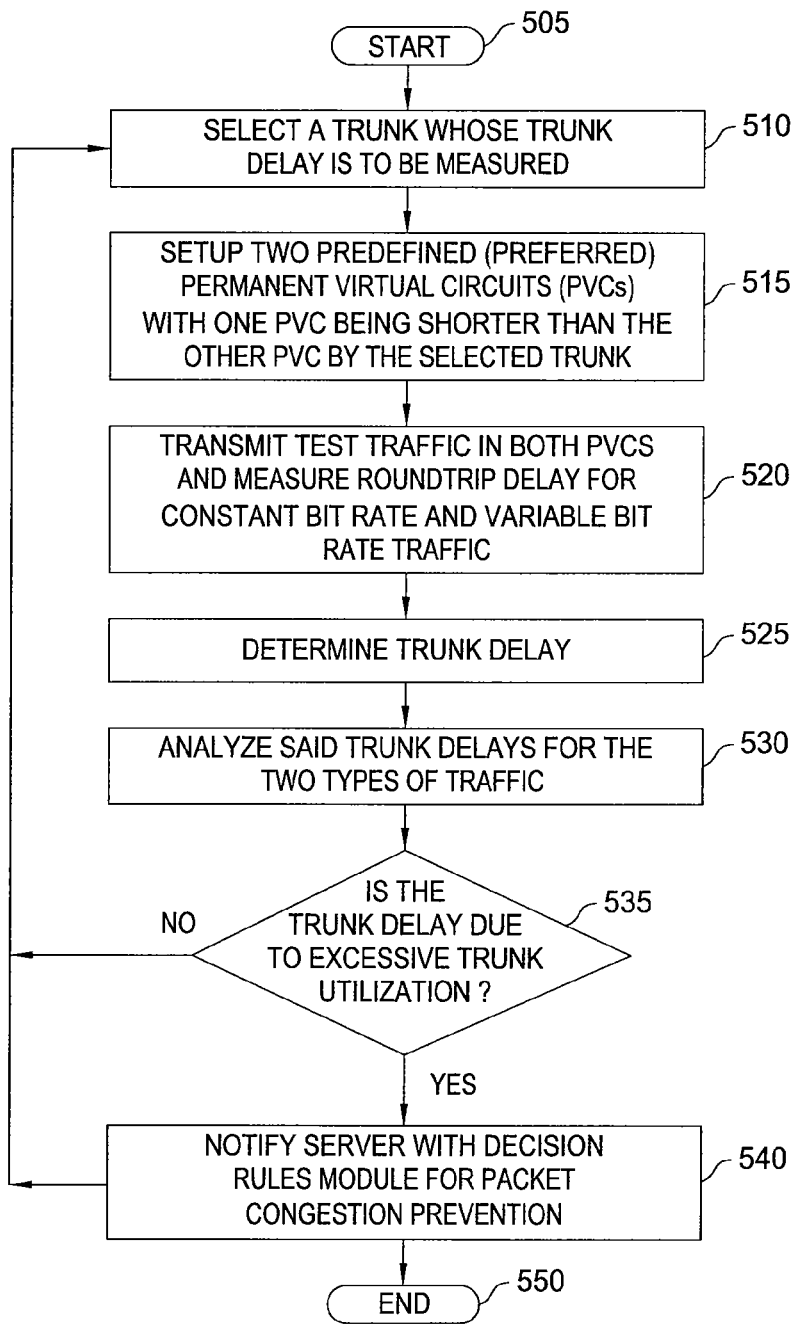
FIG. 5 illustrates a flowchart of a method for determining excessive trunk utilization.

FIG. 5 illustrates a flowchart of a method 500 for determining excessive trunk utilization. For example, the trunk monitoring module 231 may implement the method 500 to determine excessive trunk utilization by performing trunk delay measurements on Constant Bit Rate (CBR) traffic and Variable Bit Rate (VBR) traffic. Method 500 starts in step 505 and proceeds to step 510.

In step 510, method 500 selects a trunk whose trunk delay is to be measured. For example, the method selects a trunk between two switches. The method then proceeds to step 515.

In step 515, method 500 sets up two predefined (preferred) Permanent Virtual Circuits (PVC) over a shared path with one PVC being shorter than the other PVC by the selected trunk. For example, If trunk "C" is selected, one PVC may contain trunks "A", "B", and "C" while the shorter PVC contains trunks "A" and "B." The trunk selected in step 510 is not shared by the two PVCs while all other trunks are shared.

In step 520, method 500 transmits (or inserts) test traffic in both PVCs and measures roundtrip delay (time) for constant bit rate traffic and variable bit rate traffic. In one example, the method may insert constant bit rate traffic in both PVCs, and measures the roundtrip time for constant bit rate traffic. In another example, the method may insert variable bit rate traffic in both PVCs, and measures the roundtrip time for variable bit rate traffic. For the example above, the roundtrip delay for the shorter PVC is for traversing to a switch over trunks "A" and "B" and back to the source. The roundtrip delay for the longer PVC is for traversing to a switch over trunks "A", "B", and "C" and back to the source.

In step 525, method 500 determines a trunk delay. For example, the method subtracts the roundtrip delay of the shorter PVC from that of the longer PVC to determine the trunk delay for the selected trunk, i.e., for the trunk that is not shared. For the example above, the trunk delay for trunk "C" is determined by subtracting the delay for traversing only trunks "A" and "B" from the delay for traversing the trunks "A", "B", and "C."

Note that the roundtrip delays are measured for the two types of traffic, namely CBR traffic and VBR traffic separately. If the same PVCs are used for roundtrip delay measurements for both types of traffic, the method performs delay measurements for each type of traffic and records the results.

In step 530, method 500 analyzes the trunk delays for the two types of traffic, e.g., CBR traffic and VBR traffic. For example, the method determines if only one type of traffic is experiencing trunk delay or both types of traffic are experiencing trunk delay. For example, the trunk delay for a CBR may not be excessive while that of a VBR may be excessive.

In step 535, method 500 determines whether or not an observed trunk delay is due to excessive trunk utilization. For example, a service provider may set a trunk utilization of 90% of the capacity of the trunk as being excessive. In turn, if the measured trunk delay for the variable bit rate traffic indicates a substantial increase (e.g., greater than 50%) in trunk delay for variable bit rate traffic with a minimal increase in trunk delay for the constant bit rate traffic (e.g. only 1%), then method 500 may determine that the observed trunk delay(s) is due to excessive trunk utilization. It should be noted that the above example is premised on the assumption that the 50% increase in trunk delay for variable bit rate traffic coupled with the 1% increase in trunk delay for the constant bit rate traffic are associated or translated as being greater than a trunk utilization of 90% of the capacity of the trunk.

In one embodiment, it is noted that VBR traffic can be impacted by excessive trunk utilization, and the impact may be observed as an increase in trunk delay and/or loss. Whereas, CBR traffic is not significantly impacted by excessive trunk utilization. However, if there is an underlying network problem, e.g., a fiber cut that has occurred where trunks have been rerouted, then both CBR traffic and VBR traffic may be significantly impacted and the trunk delay measurements may increase for both. Under this scenario, method 500 may determine that the observed trunk delay(s) is not due to excessive trunk utilization. In step 535, if excessive trunk utilization is detected for a trunk, then the method proceeds to step 540. Otherwise, the method returns to step 510.

In step 540, method 500 notifies the application server 233 that excessive trunk utilization has been detected for a trunk. For example, the service provider may have implemented the application server 233 for receiving trunk utilization alerts to invoke a rerouting function for reducing trunk utilization rates. In other words, the method 500 may notify the application server such that mitigation steps for reducing congestion may begin immediately as discussed above in FIG. 4. The method then returns back to step 510 to continue performing trunk utilization measurements or ends in step 550.

It should be noted that although not specifically specified, one or more steps of methods 400 and 500 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 4 and 5 that recite a determining operation or involve a decision, do not necessarily require that both branches of the determining operation be practiced. In other words, one of the branches of the determining operation can be deemed as an optional step.

Figure 6:
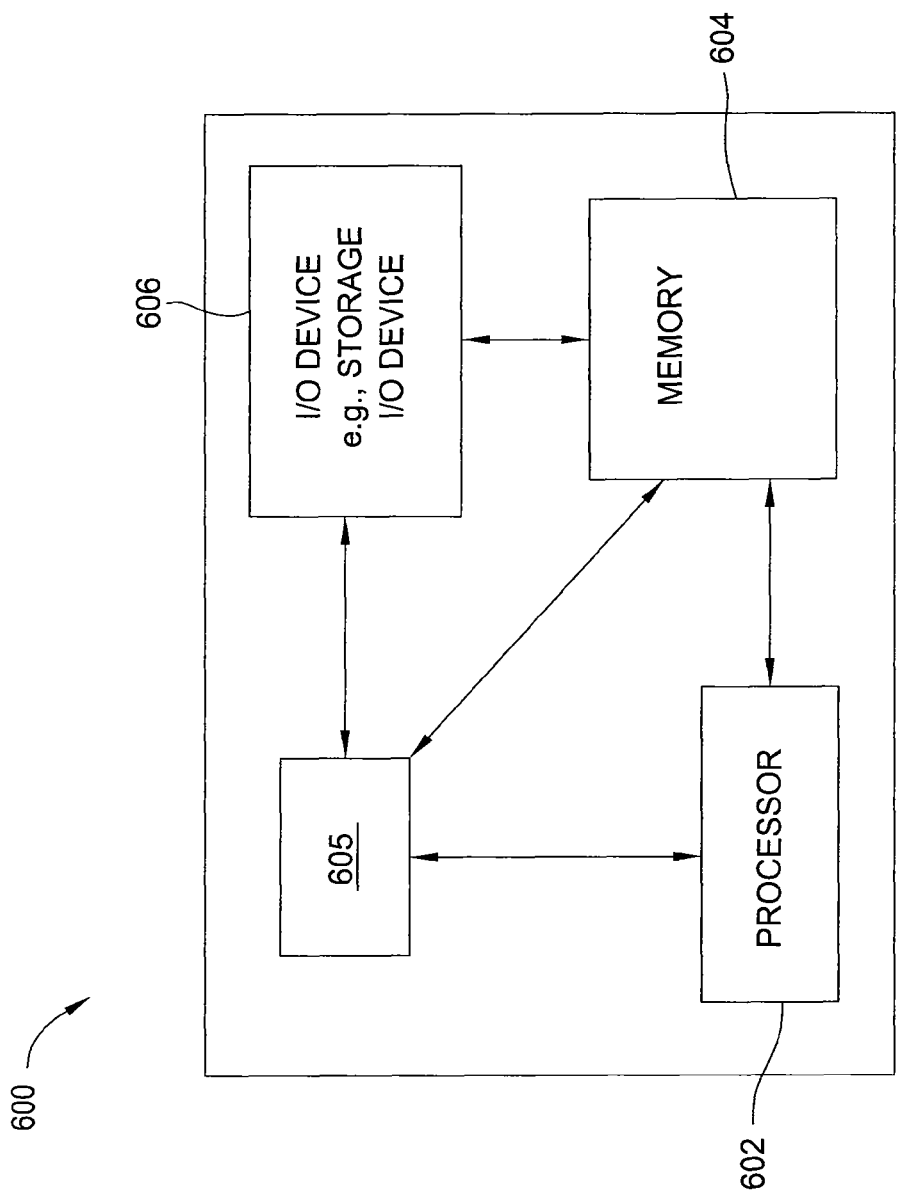
FIG. 6 illustrates a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for providing detection and prevention of packet congestion on networks or for determining excessive trunk utilization, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for providing detection and prevention of packet congestion on networks or for determining excessive trunk utilization can be loaded into memory 604 and executed by processor 602 to implement the functions as discussed above. As such, the present method 605 for providing detection and prevention of packet congestion on networks or for determining excessive trunk utilization (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for addressing a congestion condition in a communication network, comprising:
    receiving an alert for a trunk associated with a route;
    determining whether the alert is associated with a trunk failure alarm;
    determining whether the alert is associated with an asynchronous transfer mode network trouble or a frame relay network trouble if the alert is associated with the trunk failure alarm;
    determining via a processor whether the alert is associated with the congestion condition by determining whether a trunk utilization has exceeded a first predetermined threshold for the trunk, wherein the trunk utilization is derived from a measurement of a trunk delay for variable bit rate traffic, wherein the determining whether the alert is associated with the congestion condition further comprises determining whether a number of switches that is traversed by a packet on the route is in excess of a second pre-determined threshold; and
    rebuilding the route if the first predetermined threshold is exceeded for the trunk, wherein the rebuilding the route comprises providing additional resources to the route.

2. The method of claim 1, wherein the determining whether the alert is associated with the congestion condition further comprises:
    measuring the trunk delay for the variable bit rate traffic when the second pre-determined threshold is exceeded.

3. The method of claim 2, wherein the determining whether the alert is associated with the congestion condition further comprises:
   determining whether the trunk delay is in excess of a third predetermined threshold.

4. The method of claim 1, further comprising:
   notifying a customer that the congestion condition affects a network service of the customer.

5. The method of claim 4, further comprising:
   offering a service upgrade to the customer to address the congestion condition.

6. The method of claim 1, wherein the alert comprises a backward explicit congestion notification.

7. The method of claim 1, wherein the alert comprises a forward explicit congestion notification.

8. The method of claim 1, further comprising:
   determining whether the alert is associated with a packet loss alarm; and
   determining whether the alert is associated with an asynchronous transfer mode network trouble or a frame relay network trouble if the alert is associated with the packet loss alarm.

9. A non-transitory computer-readable medium having stored thereon a plurality of instructions, the plurality of instructions including instructions which, when executed by a processor, cause the processor to perform a method for addressing a congestion condition in a communication network, comprising:
   receiving an alert for a trunk associated with a route;
   determining whether the alert is associated with a trunk failure alarm;
   determining whether the alert is associated with an asynchronous transfer mode network trouble or a frame relay network trouble if the alert is associated with the trunk failure alarm;
   determining whether the alert is associated with the congestion condition by determining whether a trunk utilization has exceeded a first predetermined threshold for the trunk, wherein the trunk utilization is derived from a measurement of a trunk delay for variable bit rate traffic, wherein the determining whether the alert is associated with the congestion condition further comprises determining whether a number of switches that is traversed by a packet on the route is in excess of a second pre-determined threshold; and
   rebuilding the route if the first predetermined threshold is exceeded for the trunk, wherein the rebuilding the route comprises providing additional resources to the route.

10. The non-transitory computer-readable medium of claim 9, wherein the determining whether the alert is associated with the congestion condition further comprises:
    measuring the trunk delay for the variable bit rate traffic when the second pre-determined threshold is exceeded.

11. The non-transitory computer-readable medium of claim 10, wherein the determining whether the alert is associated with the congestion condition further comprises:
    determining whether the trunk delay is in excess of a third predetermined threshold.

12. The non-transitory computer-readable medium of claim 9, further comprising:
    notifying a customer that the congestion condition affects a network service of the customer.

13. The non-transitory computer-readable medium of claim 12, further comprising:
    offering a service upgrade to the customer to address the congestion condition.

14. The non-transitory computer-readable medium of claim 9, wherein the alert comprises an explicit congestion notification.

15. The non-transitory computer-readable medium of claim 9, further comprising:
    determining whether the alert is associated with a packet loss alarm; and
    determining whether the alert is associated with an asynchronous transfer mode network trouble or a frame relay network trouble if the alert is associated with the packet loss alarm.

16. An apparatus for addressing a congestion condition in a communication network, comprising:
    a processor; and
    a computer-readable medium in communication with the processor, the computer-readable medium having stored thereon a plurality of instructions, the plurality of instructions including instructions which, when executed by the processor, cause the processor to perform a method, comprising:
       receiving an alert for a trunk associated with a route;
       determining whether the alert is associated with a trunk failure alarm;
       determining whether the alert is associated with an asynchronous transfer mode network trouble or a frame relay network trouble if the alert is associated with the trunk failure alarm;
       determining whether the alert is associated with the congestion condition by determining whether a trunk utilization has exceeded a first predetermined threshold for the trunk, wherein the trunk utilization is derived from a measurement of a trunk delay for variable bit rate traffic, wherein the determining whether the alert is associated with the congestion condition further comprises determining whether a number of switches that is traversed by a packet on the route is in excess of a second pre-determined threshold; and
       rebuilding the route if the first predetermined threshold is exceeded for the trunk, wherein the rebuilding the route comprises providing additional resources to the route.

* * * * *